United States Patent
Siess et al.

(10) Patent No.: US 10,406,985 B2
(45) Date of Patent: Sep. 10, 2019

(54) ARMREST

(71) Applicant: GRAMMER AG, Amberg (DE)

(72) Inventors: Thomas Siess, Kastl (DE); Hubert Keller, Kuemmersbruck (DE); Josef Berdich, Amberg (DE)

(73) Assignee: GRAMMER AG, Amberg (DE)

(*) Notice: Subject to any disclaimer, the term of this patent is extended or adjusted under 35 U.S.C. 154(b) by 0 days.

(21) Appl. No.: 15/592,854

(22) Filed: May 11, 2017

(65) Prior Publication Data

US 2017/0327015 A1 Nov. 16, 2017

(30) Foreign Application Priority Data

May 13, 2016 (DE) .......... 10 2016 006 230

(51) Int. Cl.
| | | |
|---|---|---|
| *B60R 7/04* | (2006.01) | |
| *B60N 2/75* | (2018.01) | |
| *B60N 2/00* | (2006.01) | |
| *B60R 7/00* | (2006.01) | |

(52) U.S. Cl.
CPC .......... *B60R 7/04* (2013.01); *B60N 2/763* (2018.02); *B60N 2/77* (2018.02); *B60N 2/793* (2018.02); *B60N 2/00* (2013.01); *B60R 7/00* (2013.01)

(58) Field of Classification Search
CPC ........ B60N 2/4626; B60N 2/763; B60N 2/77; B60N 2/793; B60R 7/04
USPC .................................................... 297/411.36
See application file for complete search history.

(56) References Cited

U.S. PATENT DOCUMENTS

| | | | | |
|---|---|---|---|---|
| 4,659,135 A | * | 4/1987 | Johnson ............ | B60N 2/77 297/411.36 |
| 4,907,835 A | * | 3/1990 | Salters ............ | B60N 2/787 297/411.36 X |
| 7,387,342 B1 | * | 6/2008 | Clough ............ | B60N 2/77 297/411.36 |
| 7,517,010 B2 | * | 4/2009 | Saint-Jalmes ...... | B64D 11/06 297/411.36 X |

FOREIGN PATENT DOCUMENTS

| | | | | |
|---|---|---|---|---|
| DE | 19611894 B | 7/1997 | | |
| DE | 10032657 A | 1/2002 | | |
| DE | 10110330 A | 10/2002 | | |
| DE | 102004038059 A | 2/2006 | | |
| DE | 102008056290 A1 | * | 5/2010 | ............ B60N 2/929 |

* cited by examiner

*Primary Examiner* — Anthony D Barfield
(74) *Attorney, Agent, or Firm* — Andrew Wilford

(57) ABSTRACT

The armrest comprises an arm support that is vertically adjustable by an adjuster that is held on the vehicle frame. The adjustment takes place here independently of a storage compartment. In this way, the vertical position of the armrest can be adapted to the size of the occupants of the seat. The adjuster can be operated with a manual drive or electrically as an alternative, for example. The adjuster has a guide fixed to the vehicle frame and a slide that carries the arm support and that is vertically shiftable on the guide.

8 Claims, 9 Drawing Sheets

ARMREST

FIELD OF THE INVENTION

The present invention relates to an armrest. More particularly this invention concerns a vertically adjustable motor-vehicle armrest.

BACKGROUND OF THE INVENTION

An armrest with a pivotable arm support is known from the prior art. The height of the armrest can also be altered by pivoting the arm support into different use positions. However, the change in the pivot position is also associated with a change in angle.

In addition, a center console with a storage compartment and an arm support is also known from the prior art. Here, the entire console can be moved up and down vertically. This device is very complicated to manufacture and therefore is expensive.

DE 10 2004 038 059 describes a center console with a vertically adjustable armrest. The center console has an internal housing part and an external housing part that can be displaced telescopically into one another. The housing part on which the armrest is held is therefore vertically adjustable. The set height position can be locked in by a gear rack that cooperates with a catch element.

DE 196 11 894 describes a vertically adjustable armrest as part of a central console. The armrest is connected to the center console by a lifting mechanism to be vertically adjustable and is carried on a parallelogrammatic guide.

DE 101 10 330 describes a center console with an arm support and with a height adjuster that has a gear drive engaged with a gear rack mounted on a vertically adjustable frame and on whose upper end the arm support is mounted.

DE 100 32 657 discloses a center console with a lower storage compartment that can be closed by a cover. The cover has an upper storage compartment provided with a movable cover. From a closed position, the cover can be vertically adjusted, and a radio device in the upper storage compartment can be moved out of the storage compartment in the longitudinal direction of the vehicle.

OBJECTS OF THE INVENTION

It is therefore an object of the present invention to provide an improved vertically adjustable armrest.

Another object is the provision of such an improved vertically adjustable armrest that overcomes the above-given disadvantages, in particular that is simple to manufacture and is as independent as possible of other devices, such as the support compartment.

SUMMARY OF THE INVENTION

An armrest for use in a vehicle having a frame has according to the invention a vertical guide fixed on the vehicle frame, a slide vertically shiftable along the guide, and an arm support carried on the slide.

The armrest according to the invention thus comprises an arm support that is vertically adjustable by an adjuster that is held on the vehicle frame. The adjustment takes place here independently of a storage compartment, for example. In this way, the vertical position of the armrest can be adapted to the size of the occupants of the seat. The adjuster can be operated with a manual drive or electrically as an alternative, for example. The adjuster has a guide fixed to the vehicle frame and a slide that carries the arm support and that is vertically shiftable on the guide.

This guide is straight, for example, and the slide is guided on a straight path along the straight guide. The guide may comprise for example a rack that engages with a gear carried on the slide. A straight guide is a less complicated type of guide.

The guide also includes according to the invention a guide rod that has a large guide surface area for the slide. For example, the slide may reach at least partially around the circumference of the guide rod.

The guide rod may have a circular cylindrical cross section, for example, or alternatively, may have some other cross-sectional shape, such as oval, rectangular, etc. Such guide rods are available commercially.

The guide system of this invention has, for example, at least one first pair and one second pair of guides and a slide. For example, a synchronization device synchronizes the movement of the slide of the first pair and of the second pair. This prevents the slide from becoming tilted, so that the arm support can always be moved easily in the vertical direction.

According to one embodiment, the first pair and the second pair comprise respective racks forming the guide and a gear that is assigned to the slide and engages with the rack. The gears that engage with the racks are kinetically connected to one another by a gear shaft. In this way, there cannot be any tilting due to different movements between the first pair and the second pair.

The arm support can be secured in at least one vertical position by a locking device. The locking device has at least one first locking means assigned to the vehicle frame and at least one second locking means assigned to the arm support.

The locking device has as the locking means, for example, a wrap spring that is mounted on the arm support and is adjustable between a locking position and a release position. This is assigned to the armrest for example, i.e., it forms a second locking means. The wrap spring overcomes for example a structure of the guide. In the locking position, the diameter of the wrap spring is reduced to such an extent that the wrap spring grips the outside surface of the structure of the guide and prevents movement of the armrest. In the release position, the diameter of the wrap spring is enlarged so that there cannot be any fixed contact with the exterior surface and therefore movement of the arm support is enabled.

According to one embodiment, the wrap spring works together with a guide rod of the guide assigned to the vehicle frame or with a gear shaft assigned to the arm support, and the arm support in the locked position is locked in the adjusted vertical position and in the release position it is adjustable in the vertical position.

The arm support is spring-loaded by at least one spring in one direction of movement, for example. The arm support may be moved vertically downward opposite the spring force, for example, in which case the spring is put under tension. With an upward movement of the arm support, the spring force aids the upward movement.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
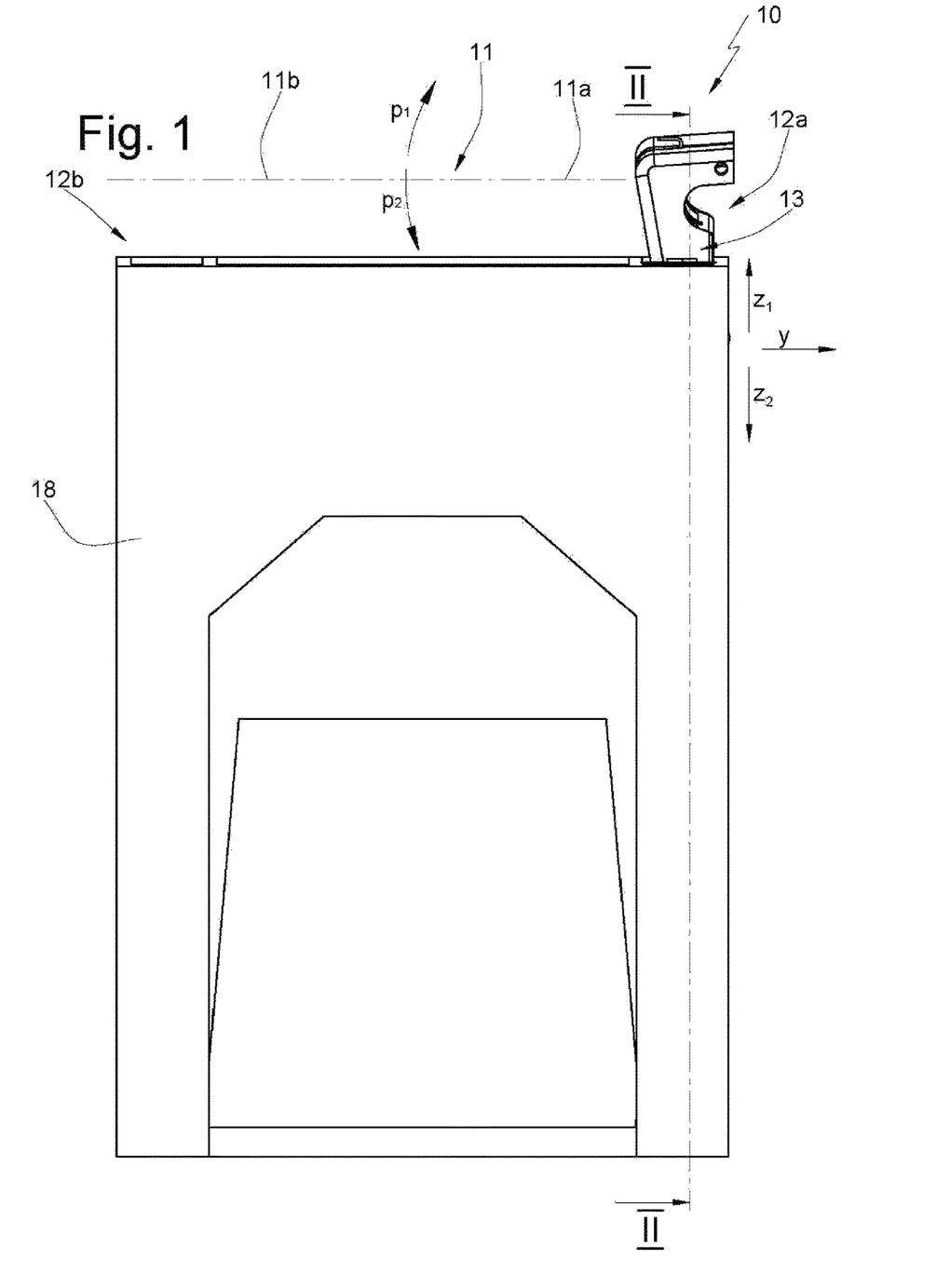
FIG. 1 is a side view of a first embodiment of an adjuster for an armrest in a first vertical height position.

As seen in the drawing, an armrest in a motor vehicle comprises an arm support 11 that is adjustable vertically by an adjuster 10 in the directions $z_1$ and $z_2$. FIG. 1 shows the arm support 11 only with a dash-dot line for the sake of simplicity. In the present embodiment, the arm support 11 is formed by two parts 11a and 11b.

The part 11a of the cover 11 is supported by a bearing and guide device 12a, and part 11b of the cover 11 is supported by a bearing and guide device 12b. Since the two parts 11a and 11b are supported in the same way, only the bearing of the cover 11a is described below. The part 11a is pivotal on a slide 13, for example (the slide of the bearing and guide device 12b is not shown in FIG. 1). The part 11a is pivotal in directions $p_1$ and $p_2$ between an approximately horizontal position shown in FIG. 1 and a vertical position pivoted up by about 90° in the direction $p_1$.

Figure 2:
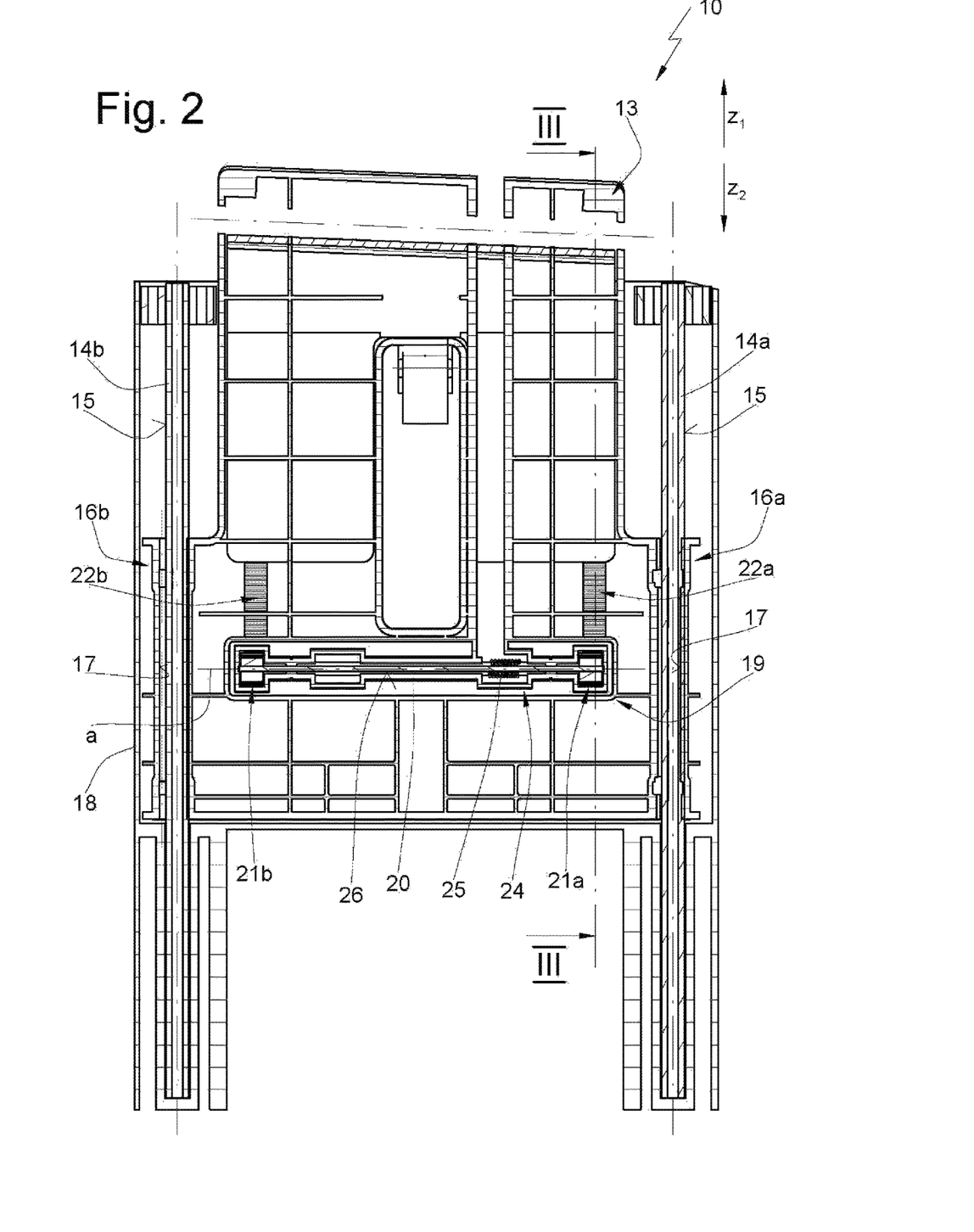
FIG. 2 is a section taken along line II-II in FIG. 1.

The slide 13 may be moved in the directions $z_1$ and $z_2$ by the bearing and guide device 12a. FIG. 2 shows that the bearing and guide device 12a has two vertical guide rods 14a and 14b. An outer edge region 16a of the slide 13 is in contact with an outer surface 15 of the guide rod 14a, and another outer edge region 16b of the slide 13 is in contact with an outer surface 15 of the guide rod 14b. The guide rods 14a and 14b, each of which has an approximately circular cylindrical cross section, pass through complementary cylindrical holes 17 in the outer edge regions 16a and 16b. The guide rods 14a and 14b are fixed in a base part 18 itself fixed on the vehicle frame. FIG. 2 shows that the slide 13 is formed as a plate.

Figure 3:
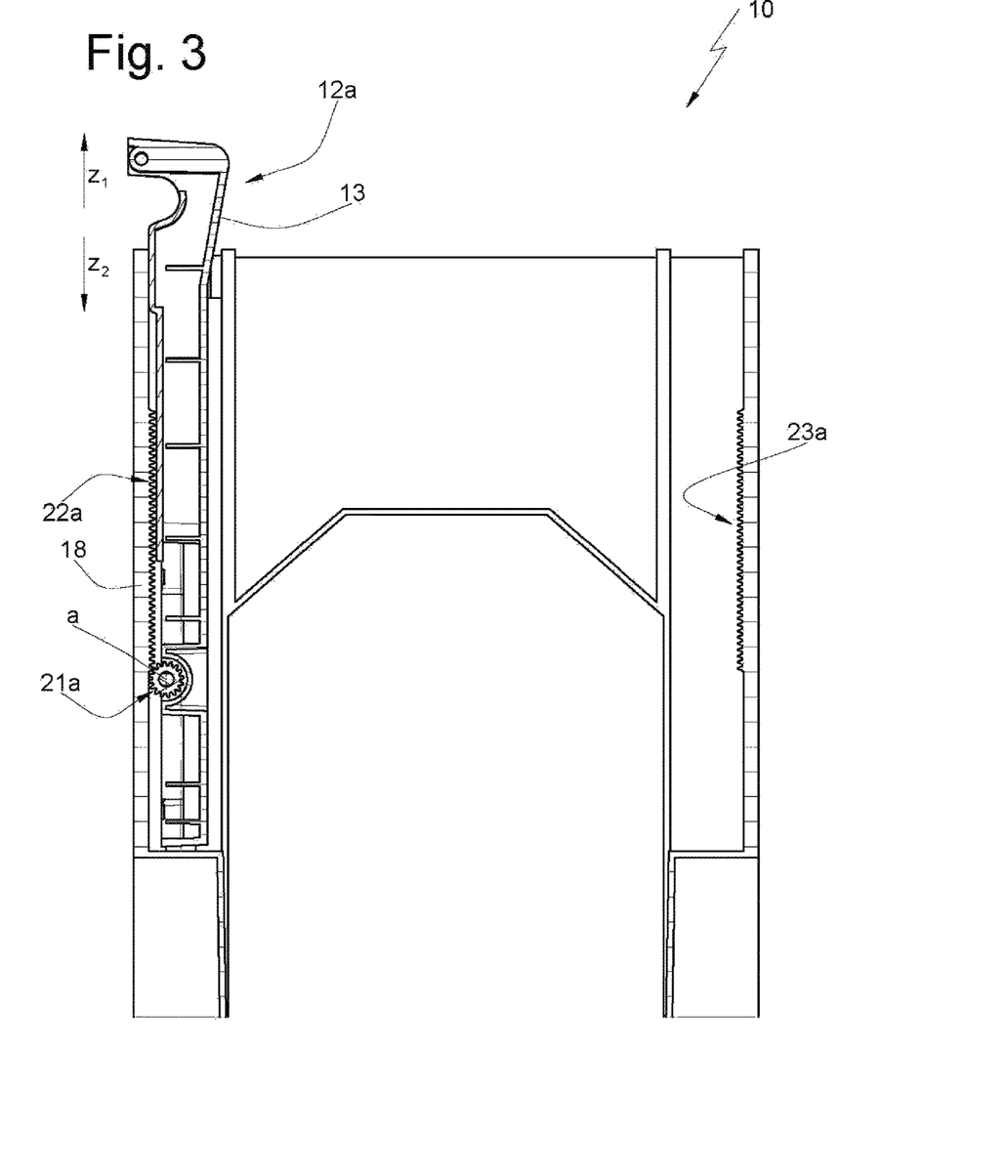
FIG. 3 is a section taken along line in FIG. 2.

Tilting of the slide 13 relative to the guide rods 14a and 14b is prevented by a synchronizing device 19. The synchronizing device 19 has a shaft 20 mounted to rotate about a horizontal rotation axis a and on each of whose ends a gear 21a and 21b is rotationally fixed, so that these gears 21a and 21b cannot rotate about the axis a relative to one another. The synchronizing device 19 also has racks 22a and 22b that are formed on the base part 18 and can be seen in FIGS. 2 and 3. The gear 21a meshes with the rack 22a and the gear 21b meshes with the rack 22b. Unwanted twisting of the slide 13 about a y axis perpendicular to the plane of the slide 13 is prevented in this way. FIG. 3 also shows a rack 23a of the bearing and guide device 12b.

Figure 4:
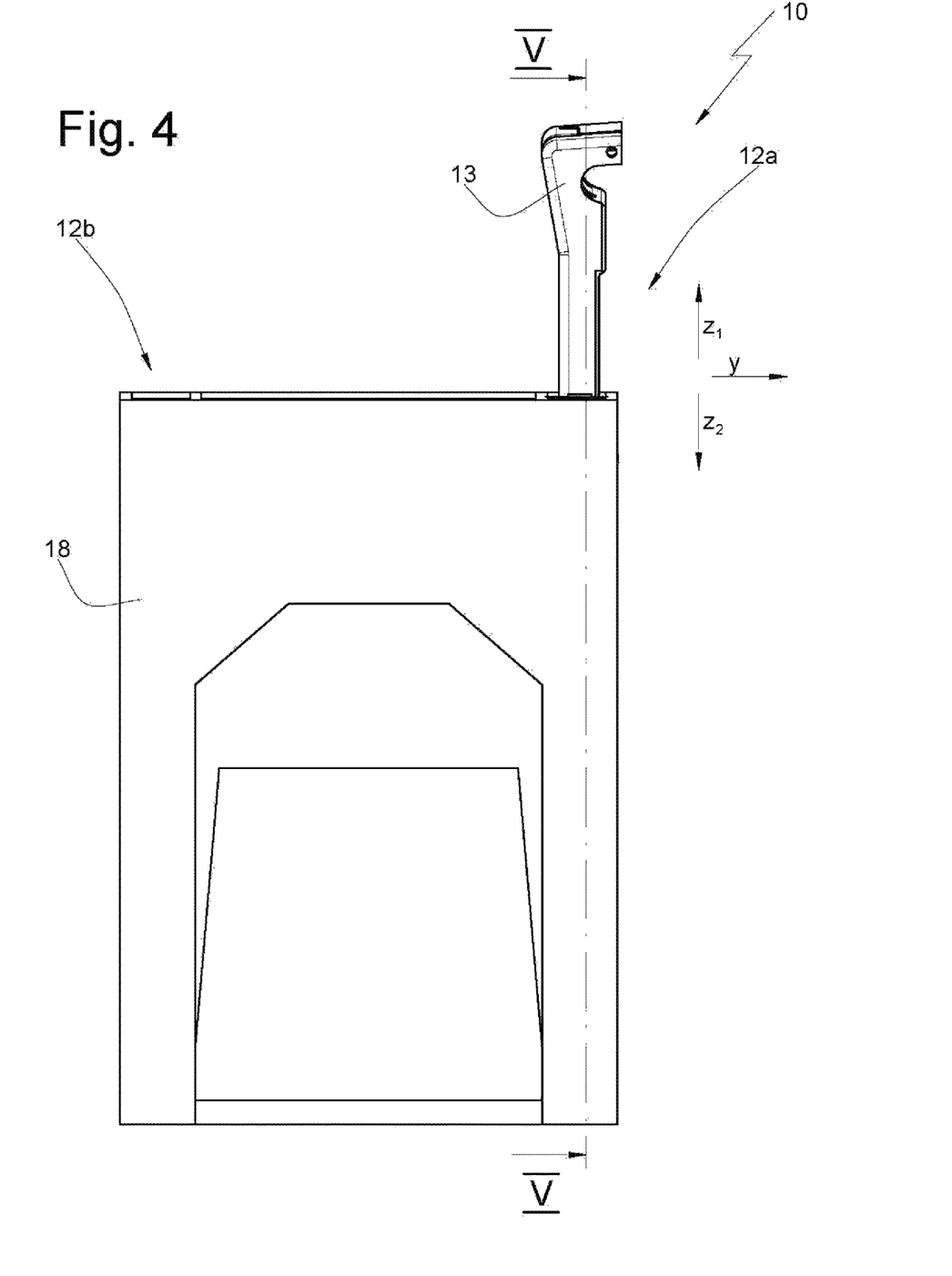
FIG. 4 shows the adjuster in a second height position as in FIG. 1.
Figure 5:
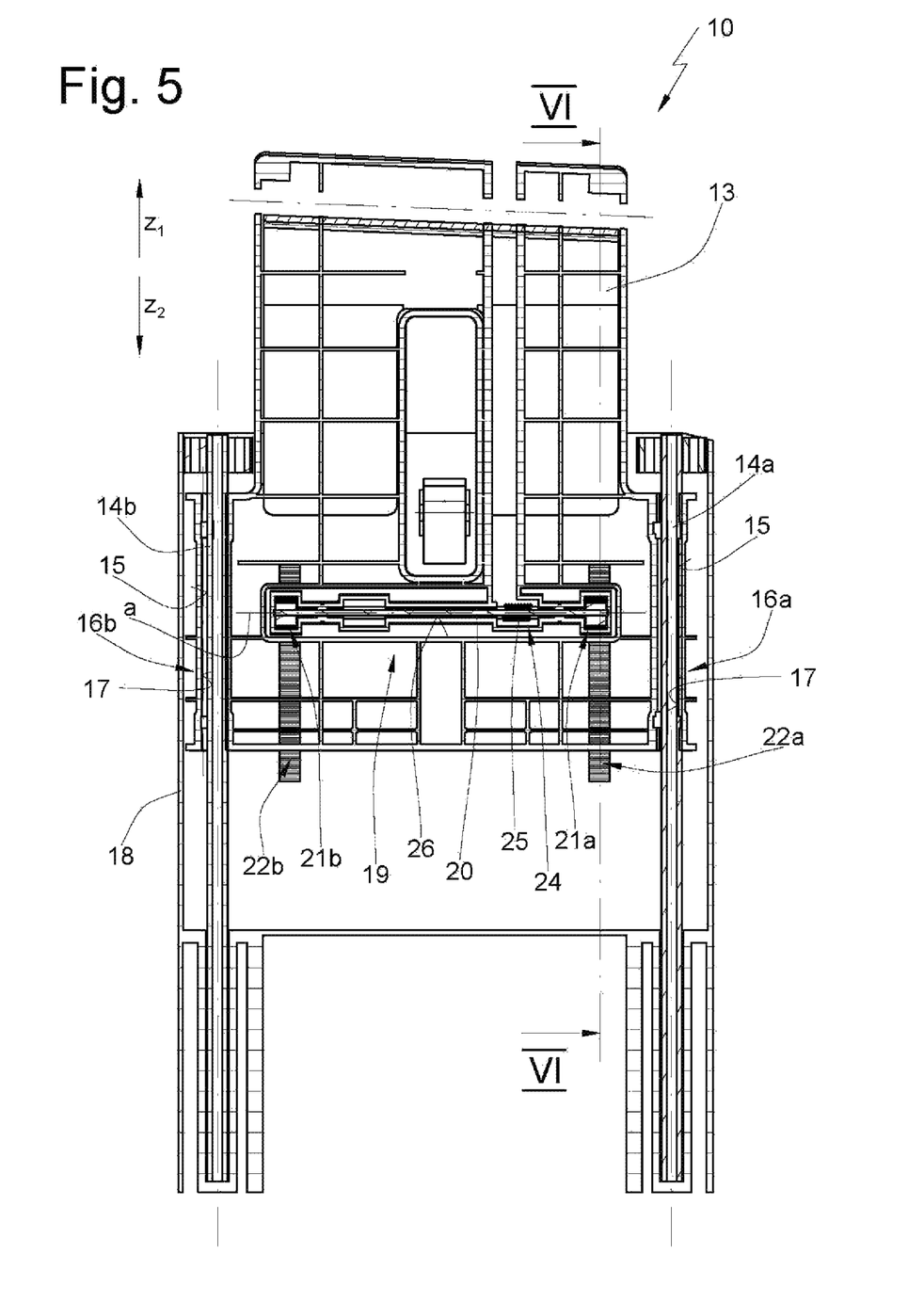
FIG. 5 is a section taken along line V-V in FIG. 4.
Figure 6:
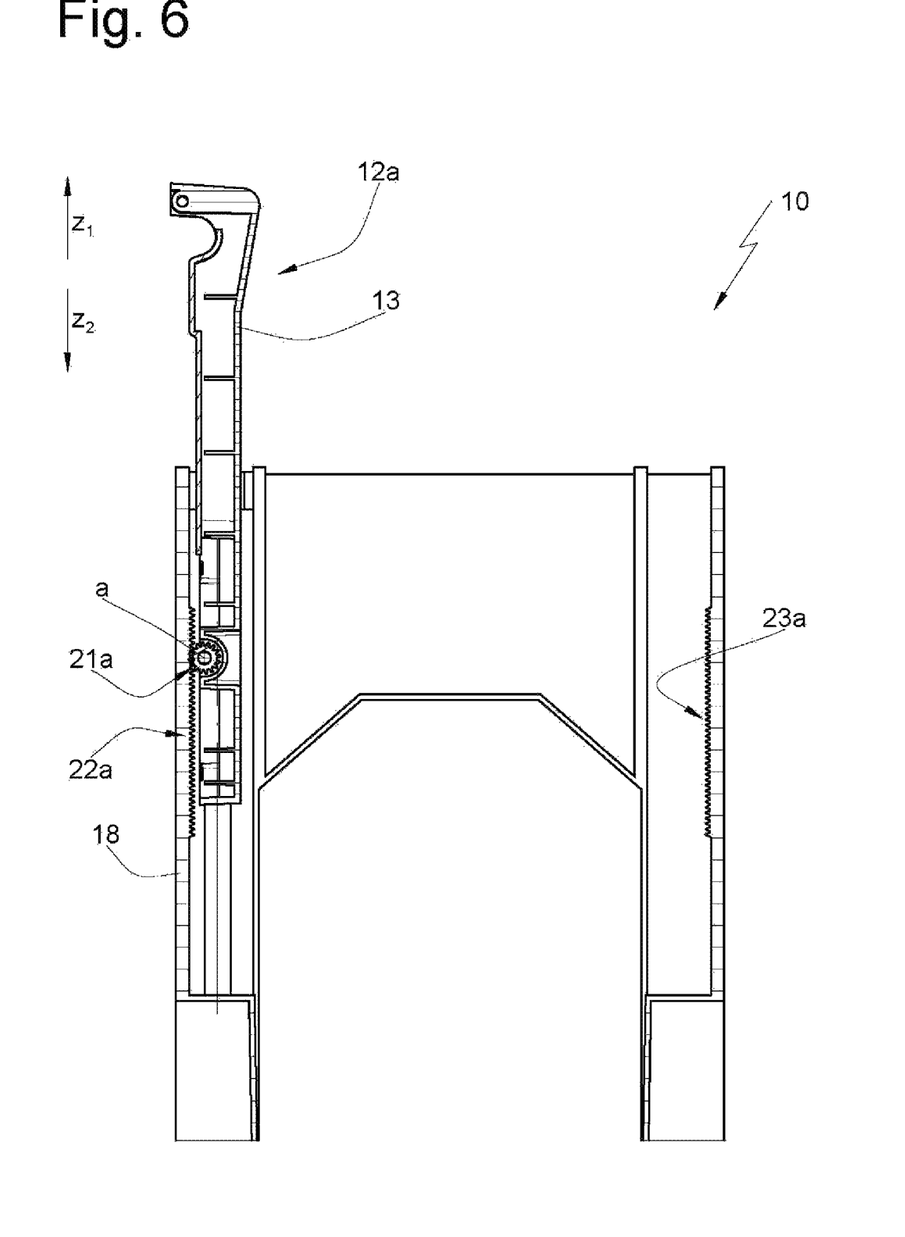
FIG. 6 is a section taken along line VI-VI in FIG. 5.

The slide 13 in FIGS. 4 through 6 is shown shifted upward in the direction $z_1$ relative to FIGS. 1 to 3. The slide 13 can be moved down of the position illustrated in FIGS. 4 to 6 in the direction $z_2$ and into the lower end position of FIGS. 1 to 3.

A locking device 24 can secure each slide 13 in any vertical position. In the present embodiment, the locking device 24 has a wrap spring 25 that cooperates with an exterior surface 26 of the shaft 20. The wrap spring 25 is fixed to the slide 13 at one spring end. The other spring end may be activated to adjust the locking device between a locked position and a release position. In the lock position, the diameter of the wrap spring 25 arranged coaxially to the shaft 20 is reduced, so that the shaft 20 is prevented from moving by the contact of the wrap spring 20 with the exterior surface 26. In other words, the shaft 20 cannot rotate relative to the slide 13, and movement of the slide 13 is thereby prevented. In the release position, the diameter of the wrap spring 25 is increased, and the shaft 20 can rotate freely. The adjustment between the locked position and the release position may take place by a switch, for example that is provided on the outside of the armrest.

The drive for the slide 13 is not shown. It may be driven manually or by motor. In the case of a manual drive, the slide may be spring-loaded. The spring is put under tension with a movement of the slide 13 in the direction $z_2$, for example, and is relaxed with a movement in the direction $z_1$.

Figure 7:
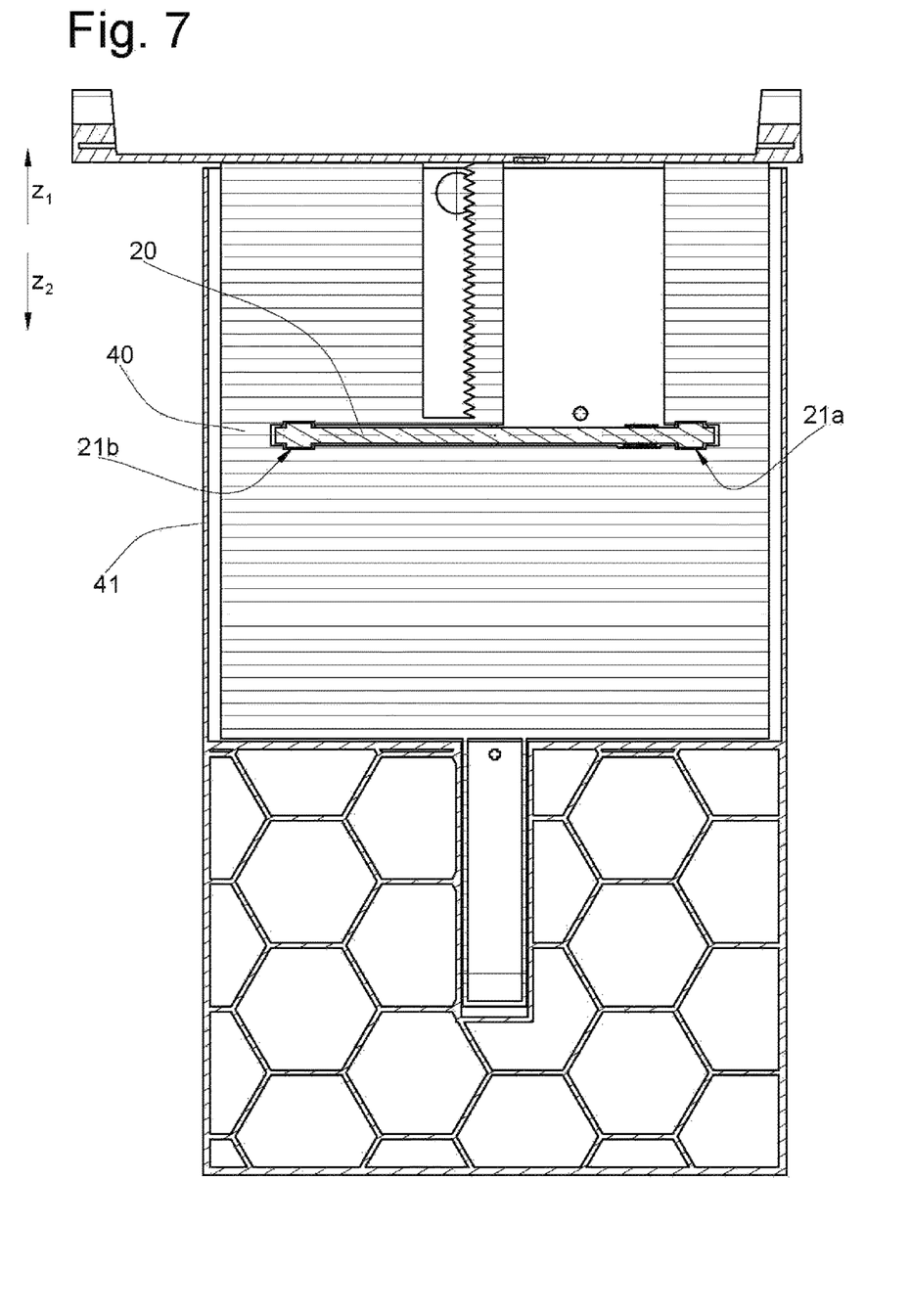
FIG. 7 is a section taken along line VII-VII in FIG. 8.
Figure 8:
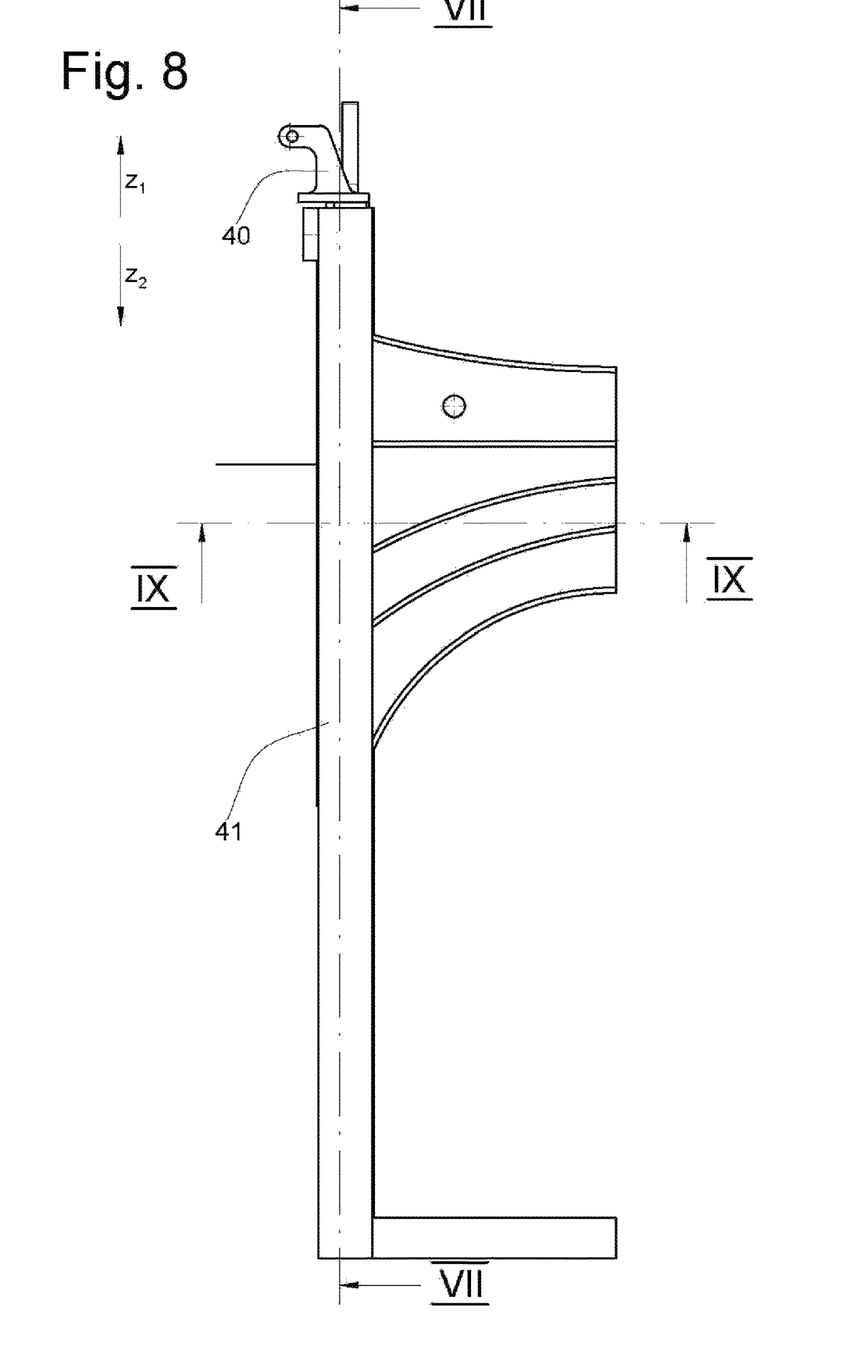
FIG. 8 is a side view of a second embodiment of an adjuster for an armrest.
Figure 9:
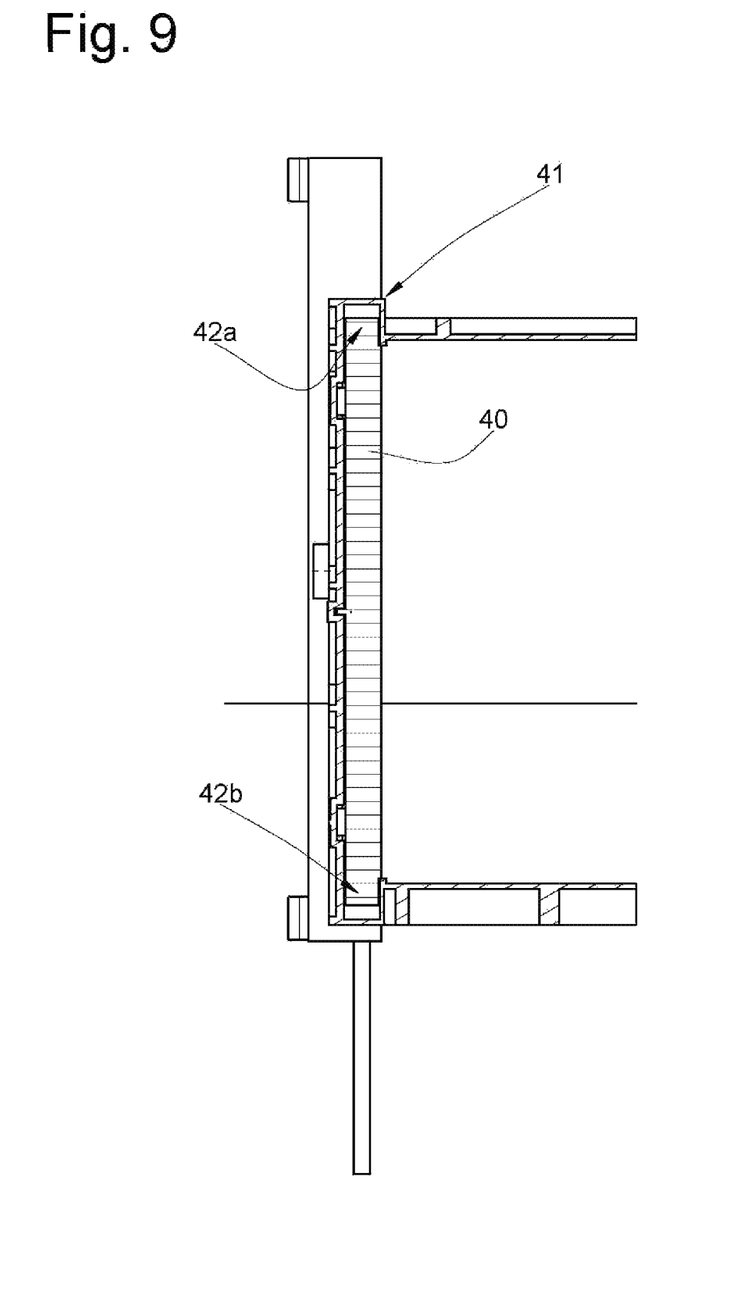
FIG. 9 is a section taken along line IX-IX in FIG. 8.

The second embodiment according to FIGS. 7 to 9 differs essentially from the first embodiment in that the slide 40 is guided movably on a base part 41 like a drawer in the directions $z_1$ and $z_2$. The base part 41 forms a shaft as a guide, so that side areas 42a and 42b of the slide 40 are gripped by U-shaped structures. The synchronizing device 19 and the locking device 24 are constructed like those in the first embodiment. In the second embodiment, the slide 40 is loaded by a roller spring in the direction $z_2$.

We claim:
1. An armrest for use in a vehicle having a frame, the armrest comprising:
   first and second pairs of vertical guide rods fixed on the vehicle frame;
   respective first and second slides vertically shiftable independently of each other along the first and second pairs of guide rods; and
   respective first and second arm supports carried on the first and second slides immediately adjacent each other.
2. The armrest defined in claim 1, wherein each of the guide rods is straight.
3. The armrest defined in claim 1, further comprising:
   respective first and second spring means urging the first and second slide for vertical upward or downward movement relative to the vehicle frame.
4. An armrest for use in a vehicle having a frame, the armrest comprising:
   first and second pairs of vertical guides fixed on the vehicle frame and all parallel to each other;
   respective first and second slides vertically shiftable independently of each other along the first and second pairs of guides; and
   respective first and second arm supports carried on the first and second slides immediately adjacent each other; and
   a respective synchronizing mechanism associated with each slide for moving each slide synchronously in the respective pair of guides; the synchronizing mechanism including:
   respective first and second racks extending parallel along the guides of the first and second pairs of guides,
   respective first and second shafts journaled in the first and second slides and having ends each juxtaposed with a respective one of the respective racks, and
   respective gears on the ends of the shafts meshing with the respective racks.
5. The armrest defined in claim 4, wherein each of the guides is formed by at least one vertical guide rod.
6. The armrest defined in claim 5, wherein the guide rods are cylindrical.

7. The armrest defined in claim 4, further comprising:
respective brake mechanisms engageable with each of the shafts for arresting the slides in vertically offset positions.

8. An armrest for use in a vehicle having a frame, the armrest comprising:
first and second pairs of vertical guides fixed on the vehicle frame;
respective first and second slides vertically shiftable independently of each other along the first and second pairs of guides; and
respective first and second arm supports carried on the first and second slides immediately adjacent each other; and
means for arresting each of the arm supports in any of a plurality of vertically offset positions relative to the frame, the means for arresting including a respective spring attached to the arm support.

\* \* \* \* \*